United States Patent Office 2,826,502
Patented Mar. 11, 1958

2,826,502

CONVERSION OF LACTOSE TO GLUCOSE AND GALACTOSE WITH A MINIMUM PRODUCTION OF OLIGOSACCHARIDES

Theodore Sfortunato, Patchogue, and William M. Connors, Bay Shore, N. Y., assignors, by mesne assignments, to National Dairy Products Corporation, New York, N. Y., a corporation of Delaware No Drawing. Application April 28, 1955
Serial No. 504,673

5 Claims. (Cl. 99—54)

This invention relates to the enzyme hydrolysis of lactose to lactase hydrolytic sugars, which term is usually thought of as including glucose, galactose, and oligosaccharides, and, more particularly, to a process of treating milk products with lactase to convert the lactose therein to glucose and galactose and obtain a negligible quantity of oligosaccharides in the final product, without changing the total sugar content thereof or the proportion of sugar to the other milk solids. The invention also relates to lactose-containing materials such as milk products in which a major proportion of the lactose has been converted to glucose and galactose, and which contain at most a negligible quantity of oligosaccharides.

The Stimpson Patent No. 2,681,858, dated June 22, 1954, describes a process for the enzyme hydrolysis of lactose to glucose and galactose. A lactase enzyme preparation in an amount within the range from 1.5 to 3% by weight of the lactose is added to a milk product which either has been concentrated to at least a 20% solids content, or has been pasteurized, or both, after which the mixture is held under conditions favoring lactase hydrolysis of lactose of glucose and galactose. Temperatures over the range from 25° to 135° F. may be employed. Hydrolysis reaches its fullest extent in from four to five hours to as much as ten days, depending upon the temperature. The hydrolysis may be halted by inactivating the lactase enzyme at any stage short of completion, or following completion of hydrolysis of substantially all of the lactose. This is most easily done by heating the mixture at an elevated temperature for a short time. Various methods for treatment of the hydrolyzed milk product are described in the patent.

In the lactase hydrolysis of lactose, glucose and galactose are not the only sugars formed. Further investigations since the filing date of the Stimpson patent have confirmed the presence of substantial amounts of additional reducing sugars in the hydrolyzed products. In fact, ten additional sugars have been detected, and more are known to be present but have not been isolated in a pure enough form for characterization. These substances when subjected to further lactase hydrolysis yield various combinations of glucose and galactose. This information, as well as the position of the substances on chromatograms obtained by filter paper chromatography (Analytical Chemistry 23, 1146 (1951), see the working examples), and their reactions with various reagents, indicate that at least some of these substances are disaccharides other than lactose, and some are even higher molecular weight polysaccharides or derivatives of these. These sugars are referred to collectively hereinafter as "oligosaccharides." The chemical structures of these materials have not been fully elucidated at the present time.

The present invention relates to a lactose hydrolysis process as generally described in the Stimpson Patent No. 2,681,858, but in the process claimed herein the lactase hydrolysis of lactose is closely controlled so as to convert the lactose into an optimum proportion of glucose and galactose, with a minimum proportion of oligosaccharides. This is accomplished by establishing the initial lactase enzyme concentration, based on the weight of lactose initially present in the aqueous reaction medium, at a minimum of 3.5%, preferably at least 5%, and later incrementally adding more lactose but not in excess of that which will reduce the lactase enzyme concentration to an absolute overall minimum of at least 1.5%, preferably not less than 3%, of the overall lactose concentration. The present process thus is distinguished from the Stimpson process both in using a higher proportion of lactase enzyme to lactose at all times, and in incrementally adding the lactose which is to be hydrolyzed.

In general, it may be stated that the proportion of lactase to lactose in the aqueous reaction medium at the start of the hydrolysis and the incremental addition of the lactose in the course of the hydrolysis are in combination responsible for the minimum production of oligosaccharides obtained in the process of the invention. Incremental addition of lactose from time to time as the hydrolysis proceeds in some way not as yet fully understood disturbs the reaction equilibria set up between the lactase enzyme, the lactose and the hydrolysis products. Because of this, the formation of oligosaccharides may be inhibited entirely, or at least kept at a minimum. Any oligosaccharides which are formed, moreover, may be hydrolyzed by the enzyme due to a deficiency in the lactose. In any event, by the time the hydrolysis of lactose is in excess of 90% there is at most a negligible amount, i. e., less than 5%, of oligosaccharides present in the medium.

The number of incremental additions of lactose in the course of a hydrolysis will depend upon the hydrolysis time and upon the starting lactase concentration. In general, it can be stated that the incremental additions should be not more than one hour apart, and can be at such shorter time intervals as may be convenient, although usually increments will not be added at less than half-hourly intervals.

Preferably, the reaction medium has as high initial and final concentrations of lactase enzyme to lactose as are economically practicable, and is held at a high level, preferably 5% or more, over the greater part of the lactose hydrolysis. The temperature and duration of the hydrolysis are not critical. In a commercial operation usually the temperature will be high enough to effect completion of the hydrolysis in a reasonable time, e. g., eight to twelve hours, or overnight. The hydrolysis can be carried to completion, i. e., upwards of 95%, without complications. Further details will be apparent from the later discussion.

The invention is particularly applicable to cow's milk as the source of the lactose. However, the term "milk" as commonly used refers to the normal secretion of the mammary glands of a mammal, and all milks contain an appreciable lactose content. The process of the invention may be employed to hydrolyze the lactose content without reducing the total sugar content of any milk including, in addition to cow's milk, mare's milk, goat's milk, ewe's milk, etc.

The term "milk product" is used generically in the specification and claims to refer not only to whole milk and skimmilk, but also to the lactose-containing products derived from any of the above milks, including whey derived from casein or cheese manufacture, the mother liquor wash water obtained as a waste product in the production of lactose from whey or milk products, and lactalbumin mother liquors such as those obtained following the precipitation of lactalbumin. All milk products which contain lactose can be treated by the process of the invention.

The process also is applicable to aqueous lactose solutions. Both milk products and aqueous lactose solutions are included in the term "reaction medium," as used in the specification and claims.

The reaction medium whose lactose content is to be hydrolyzed should have an initial solids content high enough to assure a lactose content within the range from about 3 to about 15%, and preferably not in excess of 10%. At lactose concentrations higher than 15% the hydrolysis will result in the formation of significant amounts of oligosaccharides even in the presence of 5% lactase enzyme. An initially low lactose content, however, is not deleterious, inasmuch as the lactose content will be increased in the course of the hydrolysis by the incremental additions of lactose.

If the reaction medium initially has a very low solids content, such as is true of natural milks, and wheys, it may be concentrated by any well known method, such as concentration in vacuo at a temperature in the range from 90° F. to 135° F. If the product which is to be hydrolyzed is to be used afterwards as a food, the concentration preferably is carried out by a method which does not change the character or flavor of the product.

The lactose added incrementally in the course of the process may be in the form of the solid, but preferably is dissolved in an aqueous solution. The amount of each increment is a matter of choice, so selected, of course, that their sum increases the lactose concentration of the medium to the desired final overall amount of lactose to be hydrolyzed. This is in proportion to the minimum proportion of lactase enzyme, as stated above. Each increment should contain an appreciable amount of lactose. Dropwise addition of lactose solution, for example, even though extended over a four hour period, is not effective, while incremental, hourly additions of the same amount of lactose solution is effective. It is suggested that the smallest increment should constitute 10% of the lactose initially present, and the largest 33⅓%, for best results.

For greatest efficiency, since this is essentially a batch operation, the lactase enzyme will be utilized to the greatest possible extent. This means that although less complete utilization is possible, and may even be desirable in some circumstances, usually the enzyme concentration will be brought to the final minimum value, i. e., 1.5%, preferably 3%, from the initial minimum of 3.5%, preferably 5%. This entails an increase in the lactose concentration in the range of about 150 to 250%, which is of course done by incremental additions at half hourly to hourly intervals until all of this lactose has been added. It is apparent that each increment contains much less lactose than was initially present, and this is true regardless of the initial starting lactose concentration.

Quantitative production studies have shown that within the limits stated, the higher the ratio of lactase enzyme to lactose in the reaction medium initially and throughout the process, the less the amount of oligosaccharides formed. Hence, it may be said, generally, that it is desirable to maintain the lactase enzyme concentration based on the weight of the lactose at the highest possible value throughout the hydrolysis. However, inasmuch as lactase enzyme is expensive, it may be desirable to use the smallest amount consistent with the production of a minimum amount of oligosaccharides. A 3.5% lactase enzyme concentration is the minimum starting concentration, below which oligosaccharide formation is high enough to be significant. The smallest amounts of oligosaccharides are formed when the lactase enzyme concentration is 5% and more. The upper limiting concentration of lactase enzyme is not critical, but is fixed by the economic factors. Amounts greater than 5% usually do not give any better result than 5%.

The reduction in the proportion of lactase enzyme to lactose as the hydrolysis proceeds is only apparent, not real. Actually, the porportion of lactase enzyme to lactose remains about as high as the starting proportion throughout the hydrolysis. This is because the initial enzyme concentration is established at so high a level by the required 3.5% minimum that only a small part of the enzyme is all used up by the hydrolysis, before the addition of the first lactose increment, while most of the initial lactose is used up. Thus, the first increment of lactose is added to a medium containing only a very small amount of unchanged lactose, and a very high relative proportion of enzyme. The increment takes up a part of this enzyme, but there is still an ample residuum for the next increment. This situation is repeated after each increment. However, the lactase enzyme decreases incrementally, too, and eventually reaches a minimum, which for good results, pursuant to the invention, must be above the 1.5% minimum stated. This is based on the overall amount of lactose added, because this is a simpler computation, atlhough, as the above discussion shows, it is a fiction since all of the lactose that is added is never present as such, at one time.

It has been found that when a milk product is used as the base for the reaction medium, an improvement in the extent of hydrolysis may be obtained if the milk product is pasteurized prior to inoculation with the lactase enzyme. Flash pasteurization will give a noticeably improved yield. In flash pasteurization processes, the milk product is usually heated to a temperature of from 160° to 185° F. for from 10 to 30 seconds. However, the greatest improvement is obtained if the milk product is subjected to flash pasteurization at 180° F. for 10 to 30 seconds, or to pasteurization by a holding process, i. e., subjected to a temperature of from 140° to 160° F. for 30 minutes or longer. It is thought that the phenomenon can be explained on the assumption that unpasteurized milk products contain some material which represses enzyme activity. Flash pasteurization at normal temperatures evidently is partially effective in destroying or inactivating this material, while pasteurization by a holding method is considerably more effective.

For best results, the milk is both pasteurized and concentrated, and this procedure is preferred. The pasteurization of the milk product may be accomplished either or after concentration.

To start the process, the pH of the lactose-containing reaction medium is brought to within the range from 6 to 7, and a lactase enzyme preparation is added. The lactose-containing reaction medium is then held under conditions favoring lactase hydrolysis of lactose. Temperatures over a wide range, from 40° to 135° F., may be employed. At temperatures below 40° F. lactase activity is so slow as to be almost negligible. Holding at temperatures above 135° F. will inactivate the enzyme. The production of galactose and glucose reaches its maximum in from 3 to 12 hours at temperatures of from 95° to 130° F., and at these temperatures the bacterial content of the milk is held at a minimum or decreases; therefore temperatures within this range are preferred.

The oligosaccharides concentration reaches a maximum at a very early stage in the hydrolysis, if indeed any oligosaccharides are formed, and thereafter as increments of lactose are added such oligosaccharides as exist disappear. After 90% of the lactose has been converted to lactase hydrolytic sugars, the oligosaccharides concentration becomes negligible. Accordingly, it is an important aspect of the present invention that the lactase enzyme not be inactivated and the hydrolysis arrested until after at least 90% hydrolysis, and preferably the maximum yield of lactase hydrolytic sugars, has been obtained, inasmuch as at this point under the process conditions the yield of oligosaccharides will be at a minimum. The progress of the hydrolysis can readily be observed by following the decreasing lactose concentration during the hydrolysis.

The hydrolysis may be halted when the optimum yield has been reached by treating the mixture to inactivate the lactase enzyme. Pasteurization by a holding method, as for example heating the mixture at 160° F. for 30 minutes, is effective for this purpose, but drying the mixture at a sufficiently elevated temperature, say about 145° F., will also inactivate the enzyme. If the mixture is frozen and stored at 0° F. or below, enzyme activity is arrested but will resume when the mixture is reheated to room temperature or above.

Lactose-containing products prepared in accordance with the above procedure contain 10% or less of the lactose originally present, the lactase hydrolytic sugars derived from the lactose consisting of approximately 90 to 98% glucose and galactose together and less than 0.5% oligosaccharides.

Any lactase enzyme preparation known to the art can be employed in the process of the invention. It is essential, however, if the lactase is derived from bacteria, yeasts or molds, that the lactase be uncontaminated with those enzyme systems which convert glucose and galactose to carbon dioxide and alcohol. This type of enzyme system is termed "zymase" by the art, and it will be understood that lactase preparations derived from yeast and employed in the process of the invention must be zymase-inactive in order to prevent conversion of glucose and galactose arising from hydrolysis to carbon dioxide and alcohol. If the zymase contained in the yeast is inactive, it is not necessary to separate the lactase from the yeast.

Among the yeasts which may be employed as the source of lactase enzyme are NRRL Y 665 *Saccharomyces fragilis*, NRRL YL 28 *Torulopsis spherica*, NRRL YL *Zygosaccharomyces lactis* and strains of *Torula utilis* or *Candida pseudotropicalis* adapted to the utilization of lactose for growth and fermentation. A lactase enzyme obtained from suitable bacteria, such as *Lactobacillus bulgaricus*, or from a suitable mold such as *Aspergillus oryzae*, may also be used.

The zymase may be destroyed without destroying the lactase by drying the yeast under carefully controlled conditions, or by plasmolyzing the yeast in an organic solvent, such as toluene, chloroform or ethyl ether, or by heating the yeast at 123° F. in a medium whose pH is about 7.

The following examples illustrate preferred embodiments of the process of the invention.

The oligosaccharide formation in the Examples was determined by detecting their presence and measuring the amount formed utilizing the paper chromatographic method developed by McFarren, Brand and Rutkowski (Analytical Chemistry 23, 1146 (1951)). This procedure incorporates silver nitrate directly into the solvent phase used for developing the chromatogram. The sensitivity of the Tollen's reagent under these conditions is greater than when spraying the paper strips directly with ammoniacal silver nitrate. This permitted the observation of substances which under other conditions would not have given a detectable color. The amount of the oligosaccharides formed was calculated by subtracting the sum of the lactose, galactose and glucose content determined by chromatographic methods from the amount of lactose prior to hydrolysis. However, a careful visual examination of the spots produced on a chromatogram by the oligosaccharides results in an estimated figure which closely approximates the figure arrived at by the different method. A refinement of this visual estimation technique has been used by De Whalley, Albon and Gross (Analyst 76, 287 (1951)), in the analysis of raffinose in sucrose samples. Under the chromatographic conditions specified by McFarren et al. the higher molecular weight oligosaccharides are less reducing than lactose, which in turn is less reducing than galactose and galactose is less reducing than glucose.

The lactase used in these examples was obtained from *Saccharomyces fragilis*. The enzyme was prepared by culturing a heat-treated filtered acid whey with *Saccharomyces fragilis* within the pH range 4.3 to 4.8 with moderate air injection. When the lactose was exhausted the culture was centrifuged and the resulting yeast paste was freeze-dried in order to remove the water and inactivate the zymase. The dried yeast was slurried in a 0.1 molar phosphate buffer (22.6486 g. of potassium monohydrogen phosphate and 9.5264 g. of potassium dihydrogen phosphate diluted to 2 l.) to form a 15% slurry. This was used without further treatment as a source of lactase enzyme.

The activity of this yeast was such that a 1:40 ratio of yeast lactase to lactose hydrolyzed 80% of a concentrated skim milk containing 15% lactose after four hours at 50.5° C. This hydrolysis was determined by measuring the amount of monoses formed using the Tauber-Kleiner method (Journal of Biological Chemistry, 99, 249 (1932)) and incorporating Cajori's modification for lactose-containing materials (Journal of Biological Chemistry, 109, 159 (1935)).

EXAMPLE 1

C. P. lactose was weighed out and dissolved in sufficient distilled water to form a 10% solution, and this was buffered with enough 0.1 molar phosphate buffer to adjust the pH of the aqueous medium to 7. The hydrolysis was started at 115° F. after adding enough of the lactase enzyme preparation to give a 1:20 ratio of lastase enzyme to lactose, the proportion being calculated on the basis of the lactase activity. At hourly intervals, up to a total of 5 hours' hydrolysis time, four increments composed of one-fourth of the initial volume of a supplemental 10% temperature equilibrated lactose substrate were added. Thus, at the end of 5 hours the proportion of lactase enzyme to lactose was 1:40. Thereafter, the hydrolysis was continued to a total of 24 hours. Samples were taken at the end of 5 and 24 hours, pasteurized for 30 minutes at 160° F., deproteinized and diluted to a volume which could be satisfactorily spotted on filter paper chromatograms in accordance with the method described. Only the faintest trace of oligosaccharides was evident at the end of 5 and 24 hours. The oligosaccharides concentration was estimated at 0.3%. The lactose hydrolysis was 100%.

EXAMPLE 2

Example 1 was repeated, with the exception that the ratio of lactase enzyme to lactose in the initial aqueous medium was 1:10. At the conclusion of the hydrolysis, the ratio thus was 1:20. The amount of oligosaccharides at the end of 5 hours was barely noticeable on the chromatogram, and the same result was evident at the end of 24 hours. There was little or no difference between the results in Examples 1 and 2. The lactose hydrolysis was 100%.

EXAMPLE 3

Example 1 was repeated, using a casein whey brought to a 10% lactose concentration by vacuum condensation. At the end of 24 hours, the oligosaccharides concentration was estimated at 0.5%, and the lactose hydrolysis was 100%.

EXAMPLE 4

Example 1 was repeated, with the only variation that the same amount of lactose solution was added but dropwise instead of in increments at the end of hourly intervals. The dropwise addition was at the rate of one quarter of the initial volume per hour after the first hour of hydrolysis through a total of 5 hours. Samples were taken at 2, 5, 6 and 24 hour intervals. The oligosaccharides concentration was substantial during the first 6 hours of the hydrolysis, and still substantial at the end of 24 hours. The amount of oligosaccharides at the end of the hydrolysis was estimated at 20%, and the lactose hydrolysis was 90%.

These results show that addition of large amounts of lactose by way of increments is essential to keep oligosaccharides to a minimum.

EXAMPLES 5 TO 7

Five aqueous 15% C. P. lactose solutions were prepared, buffered with the 0.1 molar potassium phosphate buffer of Example 1 to a pH of 7. 75 g. of C. P. lactose were dissolved in 500 ml. of the pH 7 buffer. 66.67 ml. of the buffered 15% aqueous lactose solution was mixed with 33.33 ml. of the 0.1 molar potassium phosphate buffer of pH 7 containing 0.5 g. of lactase yeast, prepared as set forth above, well stirred to insure uniformity. The total volume of each sample was 100 ml., and the initial enzyme to lactose proportion was therefore 1:20. Small amounts of thymol were added to all of the test solutions to inhibit bacterial growth.

Two control samples were run alongside of the test samples. Control A contained a 1:40 enzyme to lactose ratio, prepared by mixing 33.33 ml. of the buffered 15% lactose solution with 66.67 ml. of the 0.1 molar potassium phosphate buffer containing 0.5 g. of lactase yeast, control B was prepared at a 1:20 ratio, differing from A only in that 1 g. of lactase yeast was suspended in the buffer. The controls were run without incremental additions of lactose. The three remaining samples were run at half hourly increments, hourly increments and bihourly increments, respectively. Aliquots of 0.5 ml. were taken at the end of each of the incremental periods and tested for percent hydrolysis. At the end of 5 and 24 hours' hydrolysis, 5 ml. aliquots were taken from all of the test samples, heat-treated in a boiling water bath for 5 minutes and then analyzed semi-quantitatively for oligosaccharides concentration.

In the table below are listed the Tauber-Kleiner monosaccharide analyses at the end of 1, 2, 3, 4, 5 and 24 hours of hydrolysis for the samples considered.

*Table 1*

| Hydrolysis Time, Elapsed Hours | Control A | Control B | Example 5 | Example 6 | Example 7 |
| --- | --- | --- | --- | --- | --- |
| 1 | 37 | 55 | 54 | 57 | 55 |
| 2 | 60 | 78 | 69 | 71 | 77 |
| 3 | 71 | 84 | 75 | 73 | 72 |
| 4 | 80 | 92 | 75 | 75 | 80 |
| 5 | 82 | 95 | 82 | 80 | 73 |
| 24 | 92 | 98 | 97 | 95 | 62 |
| Enzyme to Lactose Ratio | 1:40 | 1:20 | 1:40 | 1:40 | 1:40 |
| Oligosaccharides | Substantial | Substantial | Trace | Trace | Appreciable |

Example 7 shows that 2 hour intervals are too long. Examples 5 and 6 show that hourly and half-hourly intervals are necessary to retain a good yield with minimum oligosaccharides production. Improvement obtained by incremental addition as compared to a continuous reaction is evident from a comparison of controls A and B and Examples 5 and 6. Even though the extent of hydrolysis is approximately the same in all four, the difference in oligosaccharides concentration is very noticeable.

EXAMPLE 8

A thin lactose syrup was diluted with water to obtain a 10% solution of lactose. This material was pasteurized at 160° F. for thirty minutes. 1% by weight of potassium monohydrogen phosphate was added, and the pH adjusted to 7 with a 30% potassium hydroxide solution.

From this batch of lactose syrup were taken two 100 ml. portions, and each was brought to 115° F. Lactase yeast prepared as set forth was added to one of the portions in an amount to produce a ratio of enzyme to lactose of 1 to 20, after which the mixture was agitated for 5 minutes. After one hour had elapsed, 25 cc. of the second portion of thin syrup was added to the substrate being hydrolyzed and the total agitated for 5 minutes. This was repeated with additional 25 cc. portions, added at the end of 2, 3 and 4 hours. At the end of 5 hours hydrolysis the Tauber-Kleiner assay indicated that the lactose had been completely hydrolyzed. The completely hydrolyzed thin syrup then was held at 115° F. with no agitation for a period up to 24 hours' hydrolysis.

Chromatographic assays of the product showed 100% destruction of the lactose and a production of glucose and galactose within the range from 96 to 98%. The oligosaccharides accounted for from 2 to 5% of the initial lactose.

Wallenfels, Naturwissenschaften, 38, 306 (1951), has postulated that oligosaccharide formation in the lactase hydrolysis of lactose proceeds according to the following scheme:

(1) Lactose + enzyme ⟶ galactose—enzyme + glucose
(a very short lactose—enzyme half life)

(2)

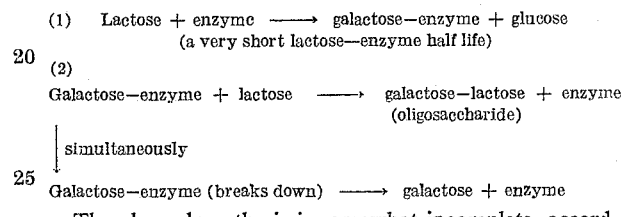

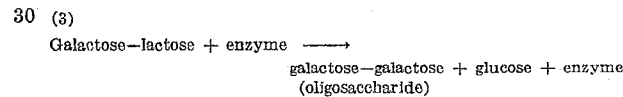

The above hypothesis is somewhat incomplete, according to our reasoning. It is proposed that the following step also results in oligosaccharides:

(3)

Galactose—lactose + enzyme ⟶
galactose—galactose + glucose + enzyme
(oligosaccharide)

It should not be unreasonable to assume that lactase (being a β-galactosidase enzyme) could further react to break down a galactose oligosaccharide, viz:

(4)

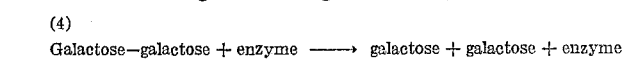

It is theorized that when more lactose is added to the reaction medium the lactase is preferentially accepted by the lactose, and this results in a destruction of the galactose-enzyme complex. This leads to more hydrolysis of lactose to produce galactose and glucose according to Reaction 1 while less of the enzyme is taken up in Reactions 2 and 3 which lead to the formation of oligosaccharides. The result is an increased yield of galactose and glucose, and a much smaller amount of oligosaccharides than would be formed if the additional quantity of lactose were not added while the hydrolysis was proceeding. Because Reaction 1 proceeds very quickly, while Reaction 2 proceeds slowly, while the reaction medium contains enough lactose Reaction 1 proceeds readily. As the amount of lactose decreases and the amount of galactose increases Reaction 2 is facilitated, and so long as there is enough excess enzyme this reaction will also take place. By the end of thirty minutes to one hour a sufficient amount of galactose has been built up, and the lactose concentration has been reduced correspondingly, so that Reaction 2 is favored. However, this state of affairs is reversed if more lactose is added. Reaction 1 once again can proceed, while Reaction 2 again falls into the background. If a sufficient number of increments of lactose are added, the reduction in the oligosaccharides yield becomes quite significant.

This theory is presented as a possible explanation of what is observed to occur. However, it is evident that the theory does not account for the failure of a dropwise addition to reduce the yield of oligosaccharides. Hence, there must be other factors which play a part in the reduction of yield of oligosaccharides.

Lactase-hydrolyzed lactose milk products have many uses, as disclosed in the Stimpson Patent No. 2,681,858, and the products of this invention can be used for the same purposes. They show a lesser tendency towards lactose crystallization than do the untreated materials. Thus, they can be used in the formation of ice cream which will not develop sandiness.

All percentages in the specification and claims are by weight.

We claim:

1. In the process of hydrolyzing lactose to glucose and galactose the improvement to minimize synthesis of oligosaccharides and favor hydrolysis of oligosaccharides in the process to obtain a minimum proportion of oligosaccharides, which comprises adding an enzyme preparation in which the enzyme consists essentially of lactase enzyme to an aqueous fluid medium comprising at most 15% lactose, the lactase enzyme being in an amount of at least 3.5% by weight of the lactose, adding thereto additional lactose, in increments at intervals of from about one-half hour to about one hour, but less than will bring the lactase enzyme concentration, based on the total lactose present and added during the hydrolysis, to below 1.5%, while holding the aqueous medium at a temperature within the range from 40 to 135° F. favoring lactase hydrolysis of lactose until there is obtained a product in which at least 90% of the original lactose has been hydrolyzed to glucose and galactose and which contains less than 5% of oligosaccharides, and then arresting the hydrolysis.

2. A process in accordance with claim 1 in which the aqueous fluid medium is a milk product.

3. A process in accordance with claim 2 in which the milk is skimmilk.

4. A process in accordance with claim 2 in which the milk product is whey.

5. A process in accordance with claim 2 which includes concentrating the milk product to a solids content of at least 20%.

References Cited in the file of this patent
UNITED STATES PATENTS
2,681,858   Stimpson _____ June 22, 1954

OTHER REFERENCES

Whistler et al.: Polysaccharide, Chemistry, Academic Press Inc., New York, 1953, pp. 56–57.

Euler: General Chemistry of the Enzymes, 1st ed., John Wiley & Sons, New York, 1912, pp. 168–169.

U. S. DEPARTMENT OF COMMERCE
PATENT OFFICE

CERTIFICATE OF CORRECTION

Patent No. 2,826,502                            March 11, 1958

Theodore Sfortunato et al.

It is hereby certified that error appears in the printed specification of the above numbered patent requiring correction and that the said Letters Patent should read as corrected below.

Column 1, line 37, for "lactose of" read -- lactose to --; column 4, line 2, for "porportion" read -- proportion --; line 44, after "either" insert -- before --; column 6, line 12, after "yeast" insert -- lactase --; column 7, line 23, for "control B" read -- Control B --; lines 57 and 58, for "controls A and B" read -- Controls A and B --; column 10, line 8, claim 3, after "milk" insert -- product --.

Signed and sealed this 22nd day of April 1958.

(SEAL)
Attest:

KARL H. AXLINE                                                ROBERT C. WATSON
Attesting Officer                                       Commissioner of Patents